United States Patent Office 2,698,823
Patented Jan. 4, 1955

2,698,823

MEDICAL PREPARATION CONSISTING OF DISODIUM CALCIUM CHELATE OF ETHYLENE DIAMINE TETRAACETIC ACID

Frederick C. Bersworth, Verona, N. J., and Martin Rubin, Silver Spring, Md.; said Rubin assignor to said Bersworth No Drawing. Application March 17, 1951, Serial No. 216,258

2 Claims. (Cl. 167—68)

This invention relates to medicine and more particularly to a chemical compound which is suitable for use in the removal of toxic metal compounds from the human body.

More particularly the object of the invention is to provide a non-toxic base exchange chemical compound which may be introduced into the blood stream and which by base exchange reaction with toxic base and rare metal ions present in the body will remove the toxic metals in the form of an excretable non-toxic compound.

Still another object is to provide an organo-metallic complex compound which is, per se, non-toxic to the human system and which may be tolerated in relatively large amounts which compound is capable of base exchange reaction with toxic metal ions in the human system to remove same as non-toxic excretable soluble salts.

Other objects will be apparent as the invention is more fully hereinafter disclosed.

In accordance with these objects we have discovered that calcium ethylene diamine tetraacetic acid disodium salt is a non-toxic organo-metallic compound which is tolerated in the human system in relatively large amounts and that this compound reacts as a base exchange compound with a large number of heavy metal and rare metal ions in aqueous solutions to convert same into soluble organo-metallic complexes with liberation of non-toxic calcium ions and that when this said calcium complex is introduced into the blood stream in pyrogen-free isotonic solution the said calcium salt effectively and relatively rapidly removes said toxic metal ions from the body system.

In accordance with these discoveries the invention consists in the use and application of non-toxic calcium ethylene diamine tetraacetic acid disodium salt in the human body for base exchange reaction with toxic metal ions to solubilize said ions as non-toxic complexes for excretion removal from the body.

Calcium ethylene diamine tetraacetic acid disodium salt is an organo-metallic complex to which is generally ascribed the following structural formula:

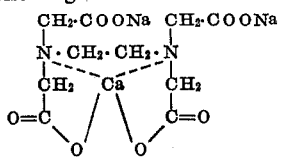

This salt in aqueous solution has a pH approximately 7.4 and in aqueous solution has the unexpected chemical property of reacting as a base exchange compound with most of the other metal ions liberating the Ca ion and forming water soluble complexes with the other metal ions that are, per se, non-toxic. In this reaction the calcium ion held in complex combination in the compound appears, contrary to expectation, to be relatively weakly complexed and to be capable of being displaced by such weakly basic metals as lead and tin. So far as we now know magnesium is about the only metal that is above calcium in the displacement series of metals in this complex compound.

Accordingly, in the treatment of cases of metal ion poisoning, such as lead poisoning for example, the introduction of this calcium complex into the blood stream intravenously or by sub-cutaneous injection, by skin absorption or by ingestion, is highly effective in removing the poisoning metal ion from the system as an inert chelate complex which is soluble in the blood stream and excretable from the body along with excess amounts of the calcium complex.

The base exchange reaction is relatively simple and understandable. In the case of di-valent metal ions the base exchange reaction is mono-molecular. Where the toxic metal ion is poly-valent (more than di-valent) two or more molecules of the calcium complex may enter into base exchange reaction with one molecule of the poly-valent metal ion. In the case of lead, the base exchange reaction is mono-molecular. In the case of radium, the base exchange reaction also is mono-molecular. Thorium, uranium, vanadium and similar polyvalent metals require two or more molecules of the calcium complex for base exchange reaction.

The use and application of this calcium complex medicinally requires first a chemically pure compound. This compound may be formed by dissolving ethylene diamine tetraacetic acid, which has been repeatedly precipitated from water to remove therefrom all water soluble impurities, in a pyrogen-free aqueous solution containing chemically pure sodium hydroxide in an amount providing two (2) molar weights of the hydroxide for each molar weight of the acid. This reaction will occur in the cold but is better and more rapid with agitation and gentle heating.

To this solution is added one molar weight of calcium ions per molar weight of the acid either in the form of a soluble salt such as the chloride or acetate or as an insoluble basic compound such as the oxide, hydroxide or carbonate, and the solution is agitated with heating until solution is complete.

The solution is then concentrated by distilling off the water of solution to a determined desired concentration per unit of volume and the pH of the solution is adjusted by appropriate additions of acid or alkali to a pH of about 7.2 to 7.4. Acid additions may include hydrochloric acid or one of the non-toxic organic acids such as acetic acid or citric acid. Alkali additions may be sodium, potassium or ammonium hydroxide or a basic non-toxic amine, such as triethanolamine.

In place of the sodium salt in this calcium complex either potassium, ammonium or non-toxic amine salts may be substituted without essential departure from the invention and with substantially equivalent results and the term sodium as it may hereinafter appear is meant to include such equivalent substituents.

In the use and application of this pyrogen-free solution of the calcium complex for the purposes of the present invention, the solution may be taken internally, or injected sub-cutaneously, or incorporated in an isotonic solution for intravenous injection, or it may be incorporated into an absorbable grease or oil for absorption through the skin into the body fluids.

Experiments have demonstrated that the tolerance amount of this calcium complex in the body is quite high and that the calcium content of the complex does not affect the system except and unless it is displaced from complex combination by base exchange reaction with other metal ions present. As all metal ion chelate compounds of this amino acid are highly soluble and are rapidly excreted from the system with body fluid a temporary excess of the calcium chelate is not injurious to the system.

As typical examples of the present invention the following examples are given by way of example but not by way of limitation:

*Example 1.—Intravenous.*—A slurry of 29.2 g. of ethylene diamine tetra acetate in 100 ml. of pyrogen-free distilled water was mixed with a solution of 8.0 g. of sodium hydroxide in 50 ml. of pyrogen-free distilled water. The acid dissolved readily on stirring and gentle warming. To this solution was added a solution of 11.1 g. of anhydrous calcium chloride in pyrogen-free distilled water. The pH of the solution was adjusted to 7.4 by the addition of sodium hydroxide solution and the final mixture made up to 1000 ml.

To a group of rabbits previously posioned by intraperitoneal injection of a solution of lead acetate was given a series of injections of this calcium disodium ethylene diamine tetra acetate by vein in dosage of 200 mg./kg. The amount of lead excreted in the urine was then determined and compared to a similar group of animals that had not been treated with this preparation. It was found that the treated animals showed approximately a 1000% increase in the quantity of excreted lead. Further in contrast to the control group it was demonstrated that the appearance of the lead in the urines was very rapid in the treated animals.

In a similar experiment a group of rates were poisoned by the administration of nickel salts. Treatment with the solution of calcium complex described above again showed a prompt excretion of the poisonous metal. In this case the recognition of the excreted nickel salts was facilitated by the appearance in the urine of the deep blue color of the nickel ethylene diamine tetra acetate complex.

*Example 2.—Subcutaneous.*—The disodium calcium ethylene diamine tetra acetate solution was prepared as described above but for purposes of subcutaneous administration higher concentrations of the active ingredient being permissible, the final volume was adjusted to 500 ml. A dosage of this solution equivalent to 500 mg./kg. of the therapeutic agent were given to groups of animals as described in the experiment above. The elimination in the urine of posionous metals as lead and nickel could be demonstrated in the same manner as described above. In the case of subcutaneous administration the onset of the elimination was delayed for a period of up to eight hours compared to the immediate results with the intraveous administration above.

*Example 3.—Ingestion.*—For oral application the disodium calcium ethylene diamine solution described above was concentrated to dryness in vacuo. The white solid so obtained showed the correct elementary analysis for calcium, sodium, carbon, hydrogen and nitrogen. For oral use it could be incorporated into a tablet containing dextrose as the excipient or into gelatin capsules. In the manner described above several groups of rats were poisoned by administration of nickel or lead salts. The calcium compound was then incorporated into the animal food in a concentration of 3% of the active ingredients. Over a period of several days a marked output of poisonous metal occurred compared to the control animals.

*Example 4.—Ointment.*—The sodium calcium ethylene diamine tetra acetate described in Example 1 was made up to a final volume of 200 ml. in water. This solution was blended into one pound of a water miscible ointment base to give a smooth creamy emulsion containing approximately 5% of the active ingredient. Daily skin application over a period of two weeks of this ointment to metal poisoned rats resulted in a marked excretion of the metal poison from the body of the animal into the urine. The amount of the chelate compound in this emulsion may be widely varied without essential departture from the invention from a very small amount approximating 1% to a large amount approximating 20%. The selection of 5% in the example given is by way of illustration and not by way of limitation.

*Example 5.*—A solution of the disodium calcium ethylene diamine tetraacetic acid salt or chelate compound of the above composition was administered to a patient with heavy metal poisoning by the intravenous route. The patient was given 5 grams of the disodium calcium ethylene diamine tetraacetic acid salt or chelate compound in this form daily for a period of three weeks, and 10 grams daily for a period of one week. There were no untoward effects of the medication. The blood pressure, kidney function, liver function and metabolic activity all remained normal. Analysis of the urinary excretion proved a substantially increased excretion of the metal poison.

In substitution for ethylene diamine tetraacetic acid in the above Na·Ca complex we may use a plurality of other polyamino poly acetic acids which are generally classified as unnatural synthetic polyamino poly acetic acids which are not metabolizable and the chelates of which are similar chemically to those of the Na·Ca chelate compound of ethylene diamine tetraacetic acid. Typical of these substituent polyamino polyacetic acids are 1,2 cyclohexyl diamino n,n' tetraacetic acid, diethyl ether b,b' diamino n,n' tetraacetic acid, ethylene glycol 1,2 ethylene ether omega,omega' diamino n,n' tetraacetic acid, trimethylene diamino tetraacetic acid, propylene diamine tetraacetic acid, and others, and where the term ethylene diamine hereinafter is used in the claims it is meant to include these equivalent substituent acids.

From the above disclosure and examples given it is believed apparent that the calcium chelate compound of the present invention is exceedingly effective in the removal of toxic metal ions from the body system and that its manner of use and concentration employed may be widely varied without essential departure from the present invention.

In view thereof all such modifications and adaptations of the calcium chelate in this new field of utility are contemplated as may fall within the scope of the following claims.

What we claim is:

1. A medical preparation consisting of a pyrogen-free aqueous solution of the disodium calcium chelate compound of ethylene diamine tetraacetic acid having a pH of 7.4.

2. A medical preparation consisting of the dehydrated pyrogen-free solution of claim 1.

References Cited in the file of this patent

UNITED STATES PATENTS

| | | |
|---|---|---|
| 2,461,519 | Bersworth | Feb. 15, 1949 |

FOREIGN PATENTS

| | | |
|---|---|---|
| 431,375 | Great Britain | July 5, 1935 |
| 245,126 | Switzerland | Oct. 31, 1946 |
| 262,670 | Switzerland | Oct. 1, 1949 |

OTHER REFERENCES

Kissin et al.; Science, vol. 112, page 367 (1950), September 29, 1950.

Albright: J. A. M. A., vol. 13, pp. 2049–2053 (1939).